United States Patent
Lu et al.

(10) Patent No.: US 7,379,500 B2
(45) Date of Patent: May 27, 2008

(54) LOW-COMPLEXITY 2-POWER TRANSFORM FOR IMAGE/VIDEO COMPRESSION

(75) Inventors: Shan Lu, Hefei (CN); Keman Yu, Beijing (CN); Jiang Li, Beijing (CN); Shipeng Li, Irvine, CA (US)

(73) Assignee: Microsoft Corporation, Redmond, WA (US)

(*) Notice: Subject to any disclaimer, the term of this patent is extended or adjusted under 35 U.S.C. 154(b) by 737 days.

(21) Appl. No.: 10/674,932

(22) Filed: Sep. 30, 2003

(65) Prior Publication Data

US 2005/0069035 A1    Mar. 31, 2005

(51) Int. Cl.
*H04N 7/12*    (2006.01)
(52) U.S. Cl. .............. 375/240.2; 375/240; 375/240.01; 375/240.18
(58) Field of Classification Search .............. 375/240, 375/240.01, 240.2, 240.12, 240.18; 382/248
See application file for complete search history.

(56) References Cited

U.S. PATENT DOCUMENTS 5,966,470 A * 10/1999 Miyashita et al. .......... 382/248

OTHER PUBLICATIONS

Cham, Aug. 1989, IEE Proceedings, vol. 136, Pt.1, No. 4, "Development of Integer Cosine Transforms by the Principle of Dyadic Symmetry", pp. 276-282.*

Lo, K.T., Simple Orthogonal Transform for Image Coding, 1993, Proceedings of IEEE Singapore International Conference, vol. 1, pp. 465-469.*

ITU Telecommunications Standardization Sector, Study Group 16, Video Coding Experts Group (Question 15), Eleventh Meeting: Portland, Oregon, USA, Aug. 22-25, 2000, "Integer Transforms for H.26L using Adaptive Block Transforms," Document Q15-K-24, Filename q15k24.doc, Generated Aug. 16, 2000, pp. 1-5.

ITU Telecommunications Standardization Sector, Study Group 16, Video Coding Experts Group (Question 15), 9thMeeting: Red Bank, NJ USA, Oct. 19-22, 1999, "Addition of 8×8 transform to H.26L," Document Q15-I-39, Filename q15i39.doc, Generated Oct. 11, 1999 pp. 1-2.

ITU Telecommunications Standardization Sector, Study Group 16, Video Coding Experts Group (VCEG), "H.26L Test Model Long Term No. 8 (TML-8) draft0," Document VCEG-N10, Filename VCEG-N10.doc, Generated Jul. 10, 2001, pp. 1-46.

Chen, Ying-Jui, et al., "Integer Discrete Cosine Transform (IntDCT)," Electrical & Computer Engineering Dept., Boston University, 8 St. Mary's St., Boston, MA 02215, Feb. 2000, pp. 1-5.

Lo, K.-T, PhD., et al., "Development of simple orthogonal transforms for image compression," IEE Proc.-Vis. Image Signal Process., vol. 142, No. 1, Feb. 1995, pp. 22-26.

Cham, W.-K, PhD, "Development of integer cosine transforms by the principle of dyadic symmetry," IEE Proceedings, vol. 136, Pt. I, No. 4, Aug. 1989, pp. 276-282.

* cited by examiner

*Primary Examiner*—Allen C. Wong
(74) *Attorney, Agent, or Firm*—Lee & Hayes, PLLC (57) ABSTRACT

To encode image and video data using a transform having low computational complexity and high compression efficiency, all elements of the matrix can be expressed with power-of-2 elements, with a template of the matrix approximating a DCT matrix.

21 Claims, 6 Drawing Sheets

LOW-COMPLEXITY 2-POWER TRANSFORM FOR IMAGE/VIDEO COMPRESSION

FIELD

The present invention relates to transforms for image and video compression.

BACKGROUND

Transformation is an essential component of image and video coding. A substantial number of compression standards utilize a Discrete Cosine Transform (DCT), which is an image-independent transform. DCT includes an algorithm, similar to Fast Fourier Transform, which converts data (pixels, waveforms, etc.) into sets of frequencies, whereby, for compression purposes, latter frequencies are stripped away based on allowable resolution loss. For video compression in devices with weak computational power including some portable devices, the high complexity of DCT is not conducive to robust processing. Therefore, alternatives for DCT are being pursued, having low computational complexity and high compression efficiency.

The pursuit of alternatives to DCT focuses on simplified transforms. Examples of such approaches to such simplified transforms include (1) a factorization-based approach and (2) an integer transform kernel redesign approach.

A factorization-based approach operates similarly to most fast algorithms for DCT, which factorize DCT to the multiple of a Walsh matrix and some sparse matrices, and then approximate the floating-point coefficients of the latter by integer or binary fractions. Examples of this approach include the C-matrix transform (CT) (Jones, et al., *The Karhunen-Loeve Discrete Cosine and Related Transforms Obtained via the Hadamard Transform*, Proc. Intl. Telemetering Conference, Los Angeles, Nov. 14, 1978, pp. 87-98) and the recently popular Integer DCT (IntDCT) with lifting scheme (Chen, et al., *Integer Discrete Cosine Transform (IntDCT)*, IEEE Trans. Signal Processing, February 2000, pp. 1-5). CT and IntDCT closely resemble DCT and are able to provide high compression. However, CT and IntDCT divide the original transform into several steps, particularly a Walsh-Hadamard transform and some sparse matrices. Although sparse matrices can be computed by fast algorithms, the total complexity is always a multiple of WHT, which is not easily reduced.

The integer transform kernel redesign approach directly designs a simple matrix to replace the floating-point DCT. This approach provides much freedom except for a matrix orthogonality restraint. The challenge of this approach is that maintaining high compression efficiency has proven to be a difficult task.

A first method in the integer transform kernel redesign approach starts with scaling the original DCT by a large integer and then searching for integer coefficients with respect to orthogonality restrictions (G. Bjontegaard, *Addition of 8×8 Transform to H.26L*, ITU-T Q15/SG16, Document Q15-I-39, Red Bank, N.J., October 2000; and Wien, et al., *Integer Transforms for H. 26L using Adaptive Block Transforms*, ITU-T Q15/SG16, Document Q15-K-24, Portland, Oreg., August 2000). A drawback of this method is that the elements of the matrix elements are often large integers, thus increasing computational complexity.

A second method in the integer transform kernel redesign approach designs a new symmetric and orthogonal matrix template and then produces a transform family. Representative results of the second method are Cham's integer cosine transform (ICT) (Cham, *Development of integer cosine transforms by the principle of dyadic symmetry*, IEEE Proceedings, Vol. 136, Pt. 1, No. 4, August 1989) and the dyadic transform (DT) (Lo, et al., *Development of simple orthogonal transforms for image compression*, IEEE Proc.-Vis. Image Signal Process., Vol. 142, No. 1, February 1995) family. These transforms can provide low complexity but with unsatisfactory compression efficiency. The matrix of DT implements an 8-point transform with only 28 additions plus 10 binary shifts, but it is completely incompatible with DCT. ICT's representative (5, 3, 2, 1) is more complex than DT, but the compression efficiency of ICT is listed between that of IntDCT and CT.

SUMMARY

A low complexity 2-power transform for image and vide compression is described herein. That is, the encoding of video and image data utilizes a matrix in which all elements are power-of-2 elements.

BRIEF DESCRIPTION OF THE DRAWINGS

The scope of the present invention will be apparent from the following detailed description, when taken in conjunction with the accompanying drawings, and such detailed description, while indicating embodiments of the invention, are given as illustrations only, since various changes and modifications will become apparent to those skilled in the art from the following detailed description, in which.

DETAILED DESCRIPTION

Example embodiments described herein include a transform matrix having elements composed of 2's low-order power.

Figure 1:
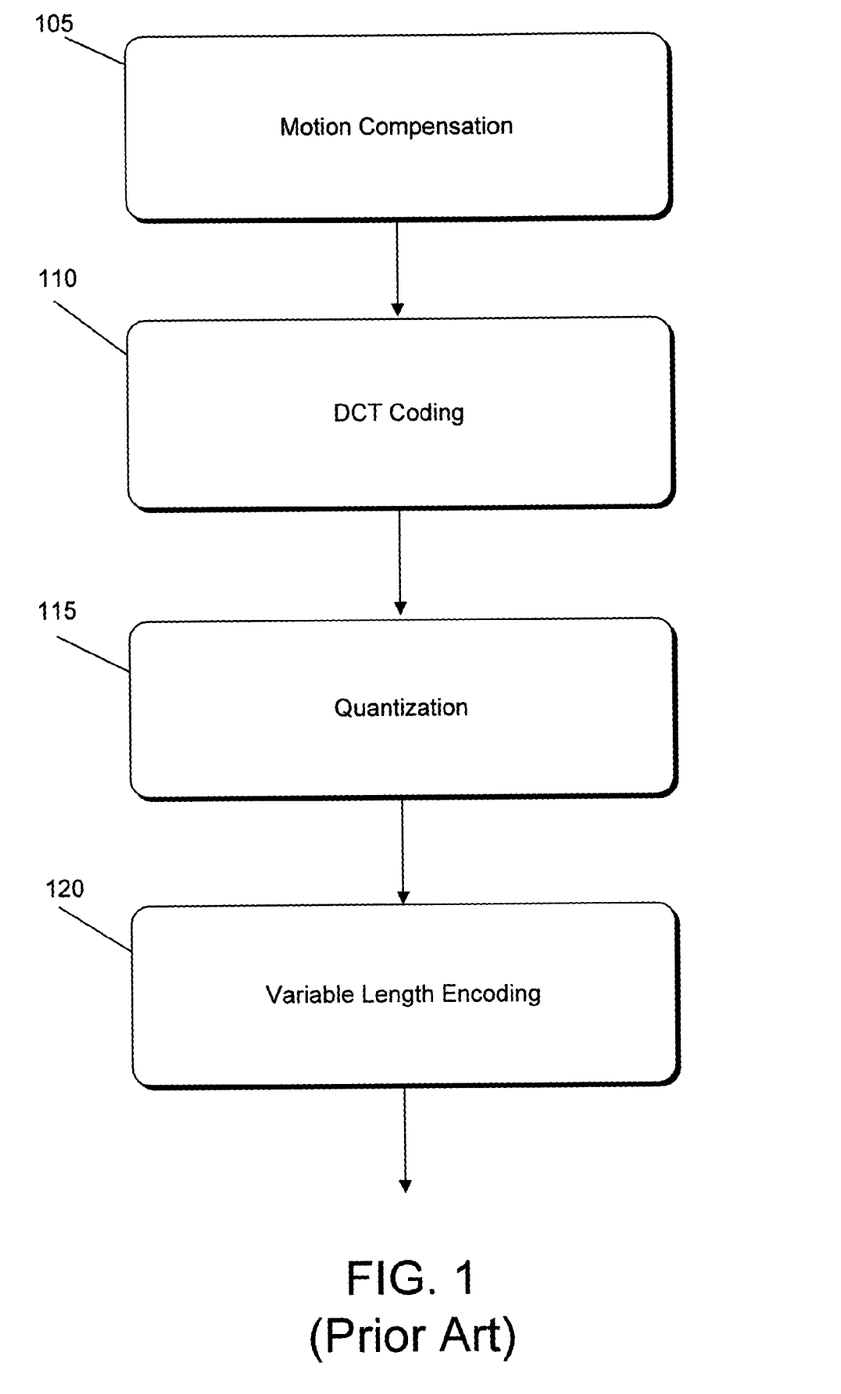
FIG. 1 is a flowchart illustrating processing flow known in the art.

Processing for spatial compression for image/video encoding is shown in FIG. 1. Motion compensation 105 predicts values of pixels by relocating a block of pixels from a previous picture. Such motion is described by a 2-dimensional vector or movement from its previous position.

Bit rate reduction in spatial compression is to minimize duplication of data from one picture to the next. Bit rate reduction has generally included transforming video data from the space and time domain to the frequency domain using a DCT encoding method 110, and then applying quantization 115 and variable length coding techniques 120 to reduce the bit rate. More particularly, after DCT encoding 110, the data is subjected to a quantization 115 process, weighted to reduce data in the high-frequency areas. More bits per pixel are used to quantize the important low-frequency coefficients, and fewer bits per pixel are used to quantize the less-important high-frequency coefficients.

Variable length encoding 120 assigns shorter code words for frequently occurring events and longer code words for less frequent events.

Orthogonality is a basic property of a transform kernel. For example, a matrix of an 8×8 pixel T can be written as $T=[s_0V_0, s_1V_1, \ldots, s_7V_7]^T$, where $V_0 \ldots V_7$ are row vectors or basis with unity magnitude, and $s_0 \ldots s_7$ are scaling factors. There are at least two constraints to an orthogonal matrix, the first is $V_i$ being orthogonal to each other, and the second is $s_0=s_1=\ldots=s_7=1$, the latter being impossible for an integer transform matrix to satisfy.

Accordingly, the example embodiments described herein implement scaling factors with the quantization process, so the second constraint can be loosened. For example, if $s_0, \ldots, s_7$ are arbitrary values, $V_0, \ldots, V_7$ are orthogonal to each other, $\text{diag}(s_0, \ldots, s_7)$ is denoted by S, and diag $(s_0^{-1}, \ldots, s_7^{-1})$ is denoted by $S^{-1}$, then $S^{-1}T$ is an orthogonal matrix, and an orthogonal transform between a matrix X and a matrix Y can be written as $Y=T'S^{-1}XS^{-1}T$. Considering that $S^{-1}$ is a diagonal matrix, the value of $S^{-1}XS^{-1}$ for arbitrary matrix X can be written as XC, where $C_{ij}=s^{i-1,j-1}$ and denotes element-by-element multiplication instead of normal matrix multiplication. The influence of non-unity scaling factors is reflected in the operation, which can be integrated into the quantization process. In the quantization process, for each (i, j) position of a matrix, $(c_{i,j}, 2c_{i,j}, \ldots, 31c_{i,j})$ is used to replace the original $(1, \ldots, 31)$ quantization factor table. The tables for an inverse transform can be similarly designed. The computational cost of quantization does not increase, while only more memory is needed to store the additional tables. By this example embodiment, six additional arrays are needed for the transform.

Accordingly, the second constraint of orthogonality can be fulfilled in the quantization process, and is therefore not necessary for the design of the transform matrix. That is, by the example embodiments, it is only necessary to make the row vectors of a matrix orthogonal to each other.

The following matrix $T_1$ is a commonly used DCT template, which preserves all the signs, equity relations and inequality relations among its elements.

$$T_1 = \begin{pmatrix} 1 & 1 & 1 & 1 & 1 & 1 & 1 & 1 \\ a & b & c & d & -d & -c & -b & -a \\ e & f & -f & -e & -e & -f & f & e \\ b & -d & -a & -c & c & a & d & -b \\ 1 & -1 & -1 & 1 & 1 & -1 & -1 & 1 \\ c & -a & d & b & -b & -d & a & -c \\ f & -e & e & -f & -f & e & -e & f \\ d & -c & b & -a & a & -b & c & -d \end{pmatrix}$$

where $a \geq b \geq c \geq d$ and $e \geq f$. If $ab=ac+cd+bd$, then the orthogonality constraints of matrix $T_1$ are met. That is, $V_i$ are orthogonal to each other and $s_0=s_1=\ldots=s_7=1$.

Another way of writing $(ab=ac+cd+bd)$ is $((a/d)+1+(b/c)=(ab)/(cd))$. In this alternative equation, if $b \neq c$, then since $a>d$ and $b>c$, $a/d$ and $b/c$ must be even. $((a/d)+1+(b/c))$ is odd and $((ab)/(cd))$ is even, rendering the equation impossible to satisfy. If $b=c$, $((a/d)+1+(b/c))=((a/d)+2)$, while $((ab)/(cd))=a/d$. This equation also cannot hold.

Figure 2:
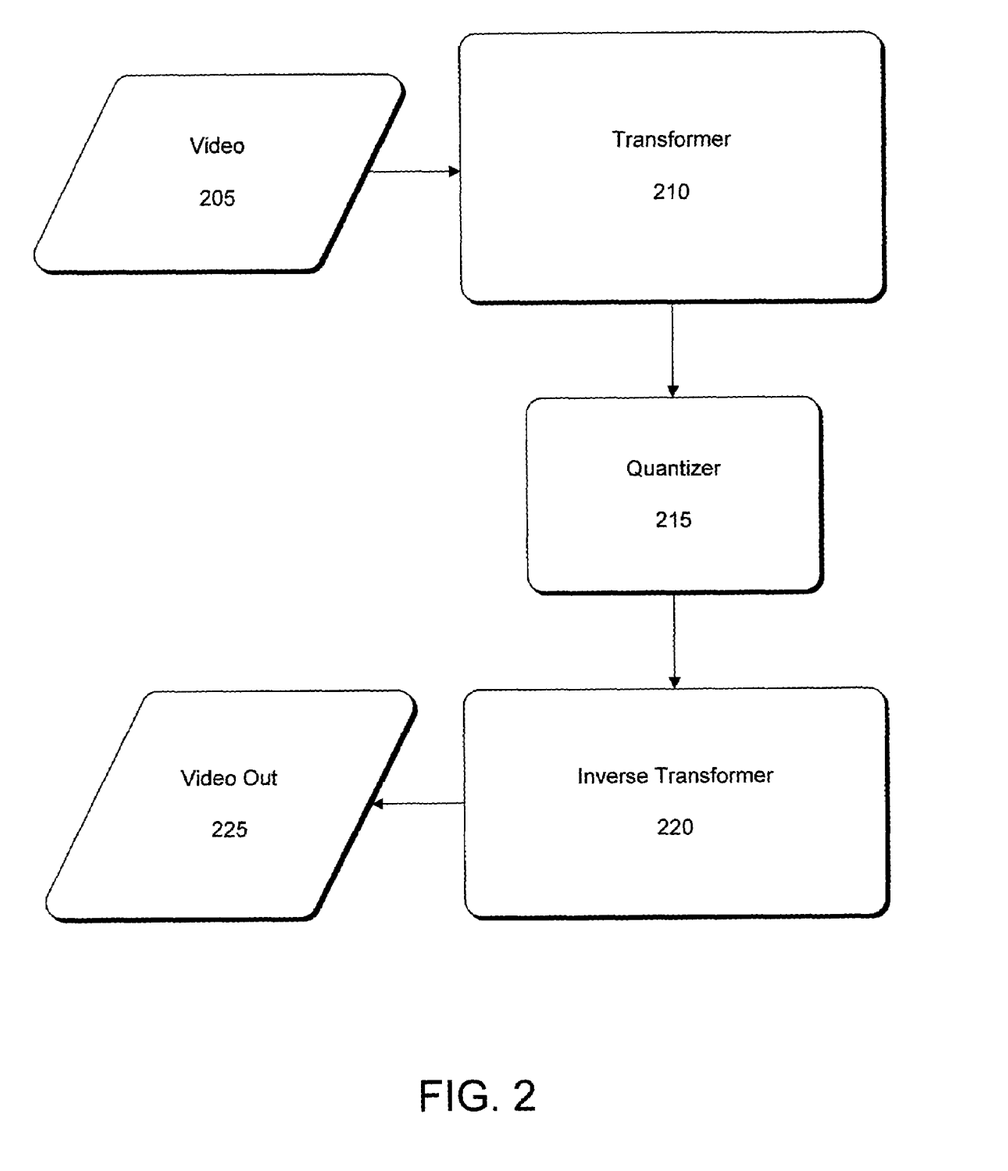
FIG. 2 is a flowchart illustrating a processing according to an example embodiment.

FIG. 2 shows an example embodiment to implement a transform with low computational complexity and high compression efficiency. To reduce the complexity, transformer 210 converts an incoming array of pixels 205 into an array of coefficients using a matrix having all elements expressed as power-of-2, with each multiplication replaced by a binary shift. If the kernel further possesses the symmetric property, the corresponding computational complexity is considered to be low. Regarding compression efficiency, the more a matrix approximates DCT, the higher the corresponding compression efficiency. Accordingly, an example embodiment begins with a DCT template. However, for the above DCT template $T_1$, there are no power-of-2 solutions. That is, a, b, c, d, e, and f are not power-of-2.

Regarding compression efficiency, the more a matrix approximates DCT, the higher the corresponding compression efficiency. In order to find a template which is mostly like that of DCT but is able to provide low computational complexity and high compression efficiency, modifications to the DCT template are required such that all elements of a corresponding matrix are expressed as power-of-2 coefficients. Thus each multiplication is replaced by a binary shift. Such a modified template would meet the orthogonality constraints described above.

According to an example embodiment, matrix $T_2$, below, is obtained by, e.g., changing some orders and signs in row 3 and row 5 of the DCT template.

$$T_2 = \begin{pmatrix} 1 & 1 & 1 & 1 & 1 & 1 & 1 & 1 \\ a & b & c & d & -d & -c & -b & -a \\ e & f & -f & -e & -e & -f & f & e \\ c & d & -a & -b & b & a & -d & -c \\ 1 & -1 & -1 & 1 & 1 & -1 & -1 & 1 \\ b & -a & -d & c & -c & d & a & -b \\ f & -e & e & -f & -f & e & -e & f \\ d & -c & b & -a & a & -b & c & -d \end{pmatrix}$$

Further, regardless of the values of coefficients a, b, c, d, e, and f of $T_2$, the row vectors of the matrix are always orthogonal.

According to an example embodiment, the template is to be filled with power-of-2 numbers. To search for power-of-2 numbers for the coefficients of a, b, c, d, e, and f, the following criteria are to be met:

1) maintain $a \geq b \geq c \geq d$ and $e \geq f$, including the order and sign;
2) the ratios of the coefficients are maintained as closely to those of DCT as possible; and
3) low order powers are preferred.

Although the complexity of binary shifts do not vary much between high power-of-2 numbers and low power-of-2 numbers, larger numbers produce large intermediate results and require more bits in storage. Furthermore, although large integer pairs may approximate the ratio of two floating-point coefficients better than small integer pair, 2-power numbers, the accuracy is the same for both.

The commonly used DCT matrix $T_1$ (above) is constructed using the following set of floating-point values of coefficients a, b, c, d, e, and f:

0.9808, 0.8315, 0.5556, 0.1951, 0.9239, 0.3827

On the other hand, for matrix $T_2$ having power-of-2 coefficients that are as close as possible to those of DCT, the floating point values of coefficients a, b, c, d, e, and f are:

$a=b=2, c=1, d=¼, e=2, f=1$

It should be noted d is not an integer for $T_2$, but multiplication thereof is implemented by a two-bit right shift. In fact, {$a=2, b=2, c=1, d=½, e=2, f=1$} may also serve as the floating point values of coefficients a, b, c, d, e, and f. The corresponding matrix possesses a similar computational complexity as that for floating point coefficients {a=b=2, c=1, d=¼, e=2, f=1}, but the compression efficiency corresponding to floating point value coefficients {a=2, b=3, c=1, d=½, e=2, f=1} is inferior.

Accordingly, the power-of-2 transform matrix is obtained as follows:

$$T_3 = \begin{pmatrix} 1 & 1 & 1 & 1 & 1 & 1 & 1 & 1 \\ 2 & 2 & 1 & 2^{-2} & -2^{-2} & -1 & -2 & -2 \\ 2 & 1 & -1 & -2 & -2 & -1 & 1 & 2 \\ 1 & 2^{-2} & -2 & -2 & 2 & 2 & -2^{-2} & -1 \\ 1 & -1 & -1 & 1 & 1 & -1 & -1 & 1 \\ 2 & -2 & -2^{-2} & 1 & -1 & 2^{-2} & 2 & -2 \\ 1 & -2 & 2 & -1 & -1 & 2 & -2 & 1 \\ 2^{-2} & -1 & 2 & -2 & 2 & -2 & 1 & -2^{-2} \end{pmatrix}$$

In analyzing the computational complexity of matrix $T_3$, it is noted that the power-of-2 matrix is symmetric like that of the DCT template. The simple coefficients of $T_3$ greatly simplify the multiplication operations, requiring only 28 addition computations and 10 binary shift operations to compute a 1-D order-8 transform.

TABLE 1

Computational Complexity Comparison

|  | IntDCT | ICT | DT | 2-Pow | WHT |
|---|---|---|---|---|---|
| Addition | 45 | 34 | 28 | 28 | 24 |
| Binary Shift | 18 | 10 | 10 | 10 | 0 |

Representative integer transforms are listed in Table 1. The power-of-2 transform corresponding to $T_3$ is among the simplest. The complexity of WHT listed in the last column represents the lower limit of integer transforms. Considering that using purely '1' can avoid binary shifts, the complexity of power-of-2 is very close to the lower limit. The flow diagram of the power-of-2 transform is shown in FIG. 3.

Figure 3:
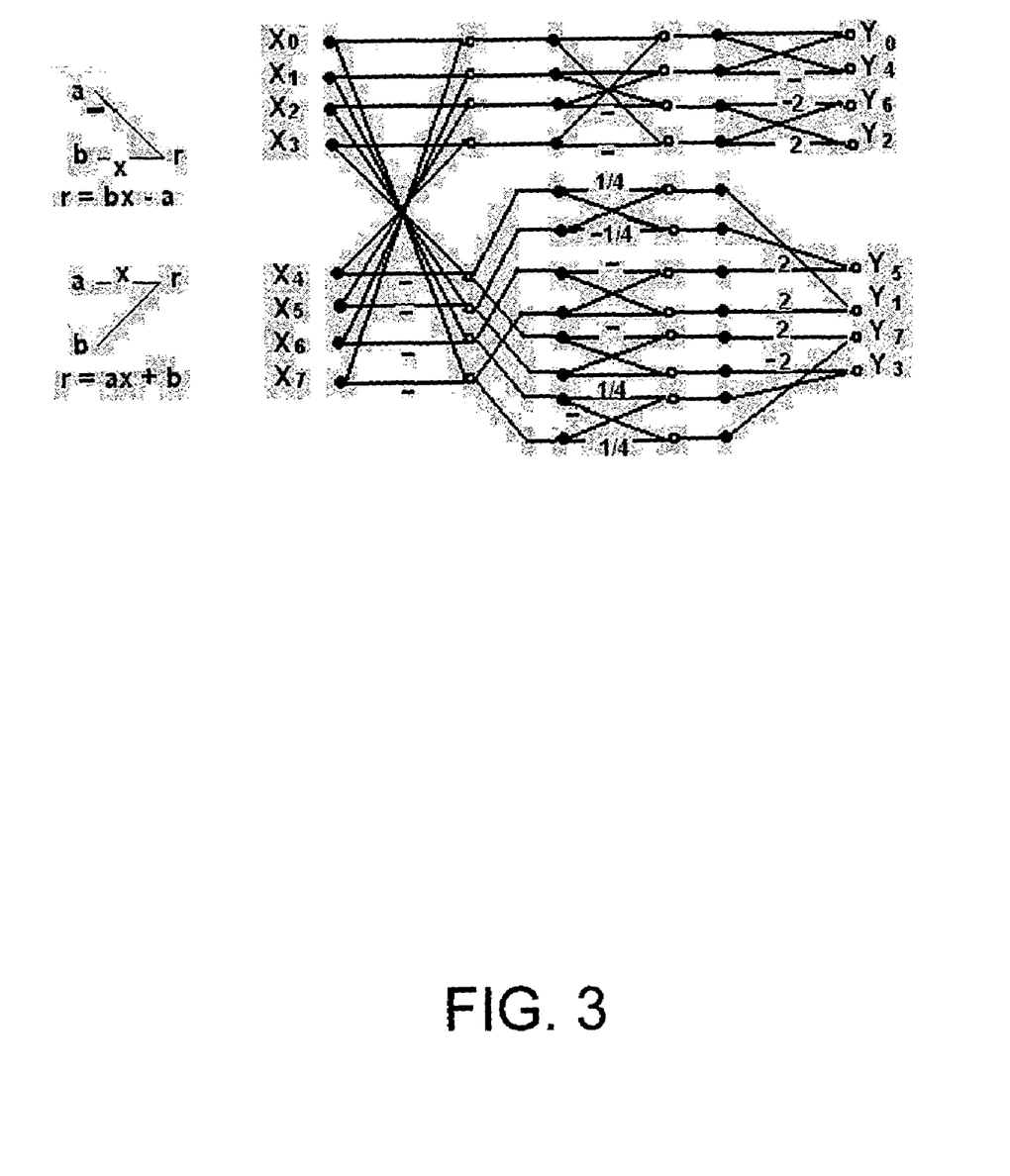
FIG. 3 is a flowchart illustrating a power-of-2 transform according to an example embodiment.

FIG. 3 represents the adding and shifting processes of transforming a vector $X(X_0, X_1, X_2, X_3, X_4, X_5, X_6, X_7)$ to a vector $Y(Y_0, Y_1, Y_2, Y_3, Y_4, Y_5, Y_6, Y_7)$ using the power-of-2 transform $T_3$. The two examples in the left part of FIG. 3 indicate the meanings of the lines and symbols. A negative symbol in a line indicates that the number is subtracted. A symbol in a line indicates that the corresponding number is multiplied.

The calculation process consists of several steps. First vector X is transformed to a vector A with its elements ($A_0, A_1, A_2, A_3, A_4, A_5, A_6, A_7$) represented by the first column of small circles in FIG. 2, i.e:

$A_0 = X_0 + X_7$
$A_1 = X_1 + X_6$
$A_2 = X_2 + X_5$
$A_3 = X3 + X_4$
$A_4 = X3 - X_4$
$A_5 = X2 - X_5$
$A_6 = X3 - X_6$
$A_7 = X4 - X_7$

The first four elements of the second column of small circles are denoted by ($B_0, B_1, B_2, B_3$) and are determined as:

$B_0 = A_0 + A_3$
$B_1 = A_1 + A_2$
$B_2 = A_1 - A_2$
$B_3 = A_0 - A_3$

The remaining eight elements of the second column of the small circles are denoted by (C) and are determined as:

$C_0 = A_4 >> 2 + A_5$
$C_1 = A_4 - A_5 >> 2$
$C_2 = A_7 - A_6$
$C_3 = A_6 + A_7$
$C_4 = A_5 - A_4$
$C_5 = A_5 + A_4$
$C_6 = A_7 + A_6 >> 2$
$C_7 = A_7 >> 2 - A_6$

Note the operation of multiplying by ¼ is equivalent to the operation of a right shift by 2 (i.e. >>2).

The elements of Y represented on the third column of the small circles are determined as:

$Y_0 = B_0 + B_1$
$Y_4 = B_0 - B_1$
$Y_6 = B_3 - B_2 << 1$
$Y_2 = B_3 << 1 + B_2$
$Y_1 = C_3 << 1 + C_0$
$Y_3 = C_6 - C_5 << 1$
$Y_5 = C_1 + C_2 << 1$
$Y_7 = C_4 << 1 + C_7$

Note the operation of multiplying by 2 is equivalent to the operation of a left shift by 1, i.e., <<1.

From the above equations that are used for transform a vector X to a vector Y based on power-of-2 matrix $T_3$, there are a total 28 additions and 10 binary shifts in the process.

Statistical models and real images can be used to evaluate the performance of the power-of-2 transform in video coding applications.

First, the performance of the example embodiment 2-power transform is compared with that of the following four representative integer transforms: IntDCT, which has gained popularity in recent years; ICT(5, 3, 2, 1), which is recommended in Cham's ICT family; DTb8, which is in Cham's DT family; and WHT. These comparative transforms represent two major simplified transform families and the former two have already been used in some practical systems.

First, coding gain is a widely used measure of compression efficiency. If the input signal is modeled by an AR (1) process, the coding gain of a given transform can be calculated analytically. The AR (1) process is characterized by the correlation coefficient ρ. The comparison results are shown in Table 2.

TABLE 2

Coding Gain (dB) of Different Transforms

| ρ | DCT | 2-Pow | ICT | DT | WHT |
|---|---|---|---|---|---|
| 0.95 | 8.83 | 8.70 | 8.65 | 8.40 | 7.95 |
| 0.90 | 6.28 | 6.16 | 6.11 | 5.88 | 5.50 |
| 0.85 | 4.83 | 4.73 | 4.67 | 4.46 | 4.15 |
| 0.80 | 3.83 | 3.75 | 3.69 | 3.50 | 3.25 |

The power-of-2 transform of the example embodiment described herein produces higher coding gains than those of ICT(5, 3, 2, 1) and much higher coding gains than those of DT. The example embodiment power-of-2 transform is approximately 0.11dB lower than that of DCT. Since IntDCT is implemented by several steps rather than in one transform kernel, its coding gains are not compared here.

The above transform modules are implemented in the H.263+ standard codec based on TMN8, using two video sequences, Foreman and Silent. The Rate-Distortion (RD) curves are shown in FIGS. 4 and 5.

Figure 4:
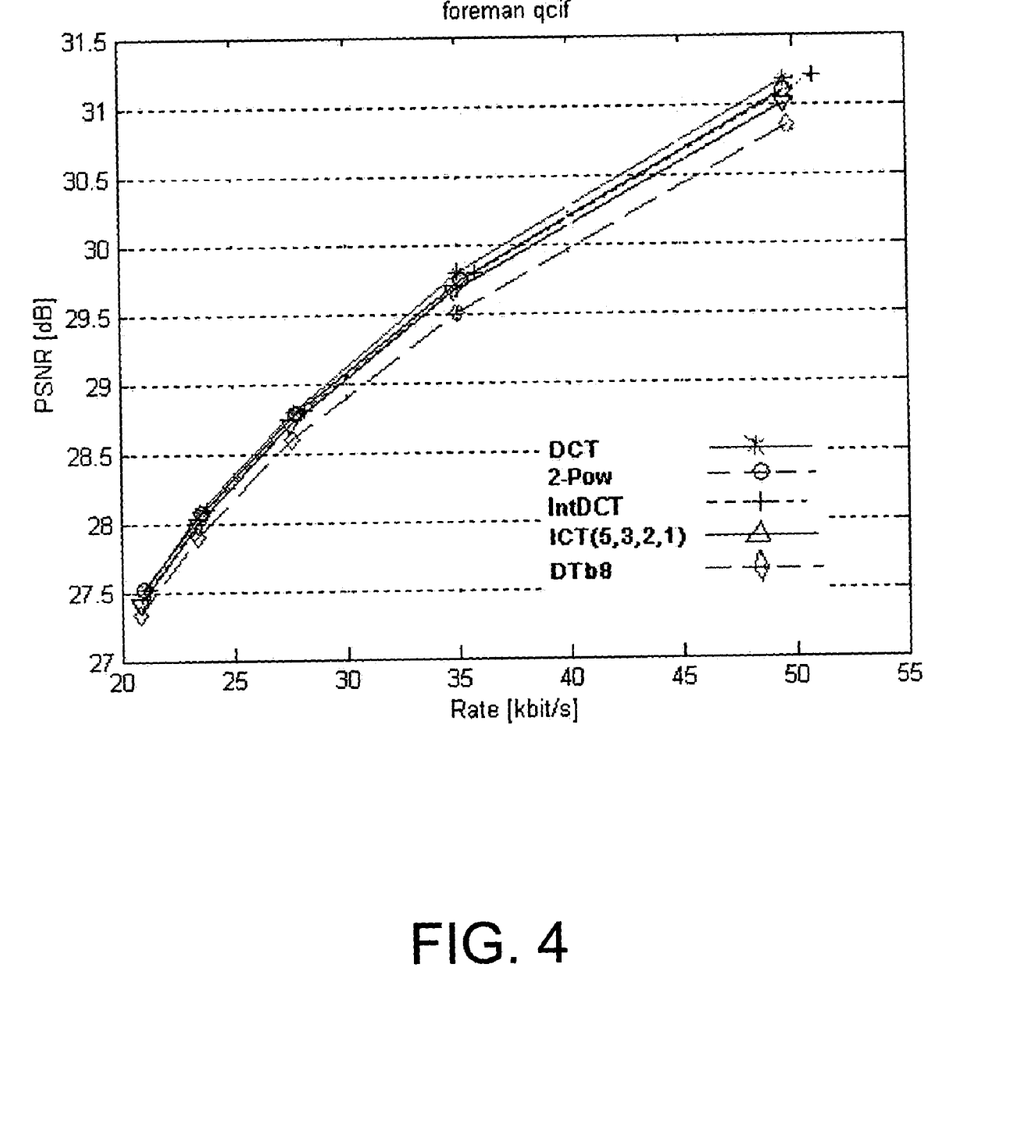
FIG. 4 shows comparative results of an example embodiment against known implementations.
Figure 5:
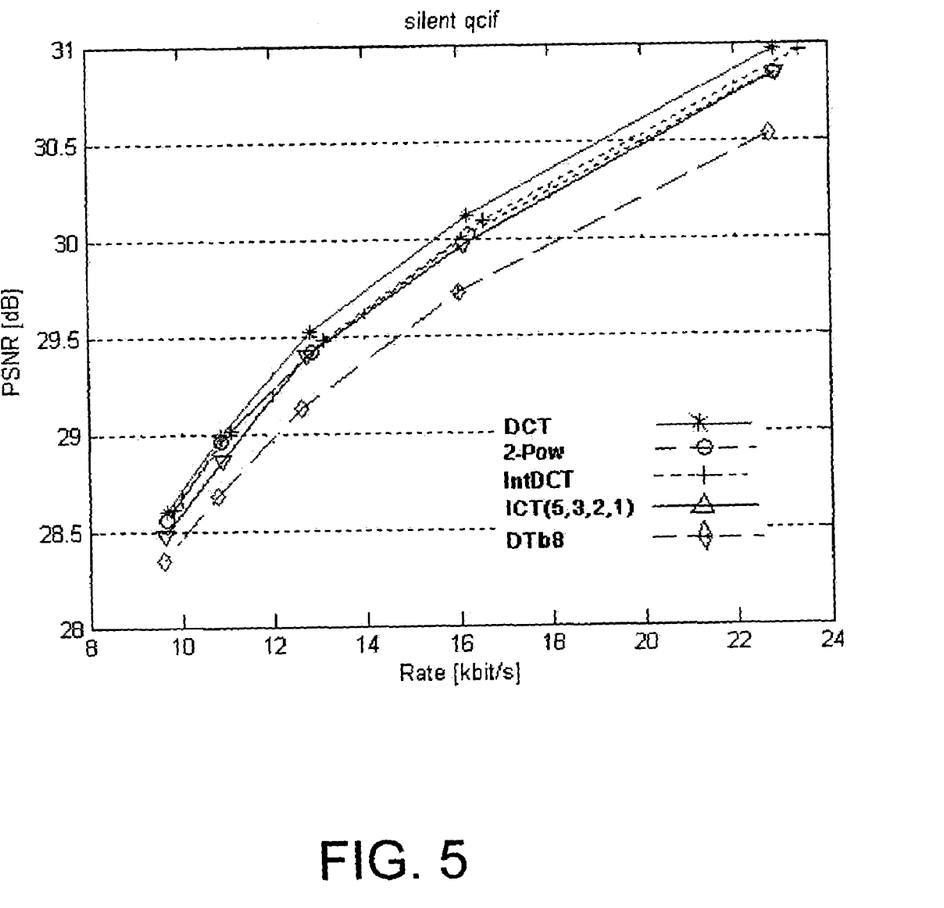
FIG. 5 shows further comparative results of an example embodiment against known implementations.

In FIG. 4, the RD curve of the power-of-2 transform (shown by a dashed line with circles) almost overlap with that of IntDCT (shown by a dashed line with crosses). Both are superior to ICT (shown by solid line with triangles) though inferior to DCT. A similar trend appears in FIG. 5. At low bit rates, the performance of the example embodiment power-of-2 transform equals that of DCT while the gap is enlarged at high bit rates.

Although DTb8 is also a power-of-2 transform, the RD curves corresponding thereto are much lower than that of the example embodiment. Since the compression efficiency of WHT, which possesses the lowest computational complexity, is significantly inferior to that of DT, the RD curves corresponding to WHT are not considered here. In general, the PSNR difference between power-of-2 and DCT is less than 0.11 dB.

Continuing with the flow chart of FIG. 2, quantizer 215 reduces the number of bits needed to store the transformed coefficients by reducing the precision of those values. Since this is a many-to-one mapping, it is a lossy process and is the main source of compression in an encoder. Quantization can be performed either on each individual coefficient, which is known as Scalar Quantization (SQ), or on a group of coefficients together, which is known as Vector Quantization (VQ). Both SQ and VQ are known in the art, and therefore a description thereof is not provided here. The output of quantizer 215 is either stored as a media file or transmitted to another communication node, then input to a decoder which includes an inverse transformer 220 to reconstruct the image by implementing an inverse power-of-2 transform.

As a result of the example embodiments described above, low complexity power-of-2 transform for image and video compression is provided for applications for, e.g., mobile devices. The elements are al in 2's low-order power. Computational complexity analysis, coding gains, and RD curve comparison show that the power-of-2 transform is simpler than IntDCT and ICT, while the compression efficiency of the power-of-2 transform is similar to that of IntDCT, higher than that of ICT and significantly higher than that of DT and WHT. The low magnitude of the elements also avoids large memory consumption, which is a problematic issue for many integer transforms.

Figure 6:
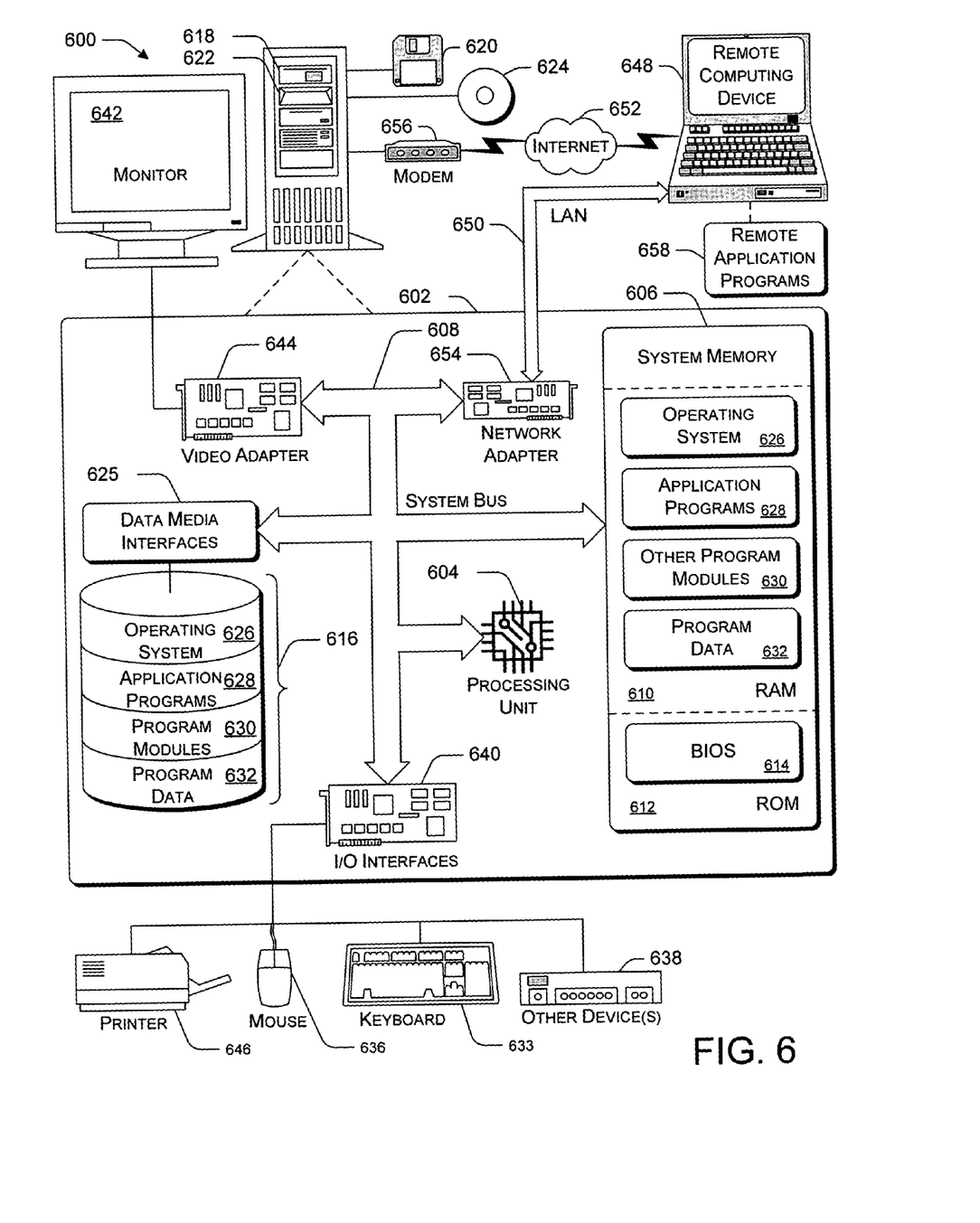
FIG. 6 illustrates a general computer environment which can be used to implement techniques described herein.

FIG. 6 illustrates a general computer environment 600, which can be used to implement the compression techniques described herein. The computer environment 600 is only one example of a computing environment and is not intended to suggest any limitation as to the scope of use or functionality of the computer and network architectures. Neither should the computer environment 600 be interpreted as having any dependency or requirement relating to any one or combination of components illustrated in the example computer environment 600.

Computer environment 600 includes a general-purpose computing device in the form of a computer 602. The components of computer 602 can include, but are not limited to, one or more processors or processing units 604, system memory 606, and system bus 608 that couples various system components including processor 604 to system memory 606.

System bus 608 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394, i.e., FireWire, bus.

Computer 602 may include a variety of computer readable media. Such media can be any available media that is accessible by computer 602 and includes both volatile and non-volatile media, removable and non-removable media.

System memory 606 includes computer readable media in the form of volatile memory, such as random access memory (RAM) 610; and/or non-volatile memory, such as read only memory (ROM) 612 or flash RAM. Basic input/output system (BIOS) 614, containing the basic routines that help to transfer information between elements within computer 602, such as during start-up, is stored in ROM 612 or flash RAM. RAM 610 typically contains data and/or program modules that are immediately accessible to and/or presently operated on by processing unit 604.

Computer 602 may also include other removable/non-removable, volatile/non-volatile computer storage media. By way of example, FIG. 6 illustrates hard disk drive 616 for reading from and writing to a non-removable, non-volatile magnetic media (not shown), magnetic disk drive 618 for reading from and writing to removable, non-volatile magnetic disk 620 (e.g., a "floppy disk"), and optical disk drive 622 for reading from and/or writing to a removable, non-volatile optical disk 624 such as a CD-ROM, DVD-ROM, or other optical media. Hard disk drive 616, magnetic disk drive 618, and optical disk drive 622 are each connected to system bus 608 by one or more data media interfaces 625. Alternatively, hard disk drive 616, magnetic disk drive 618, and optical disk drive 622 can be connected to the system bus 608 by one or more interfaces (not shown).

The disk drives and their associated computer-readable media provide non-volatile storage of computer readable instructions, data structures, program modules, and other data for computer 602. Although the example illustrates a hard disk 616, removable magnetic disk 620, and removable optical disk 624, it is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on hard disk 616, magnetic disk 620, optical disk 624, ROM 612, and/or RAM 610, including by way of example, operating system 626, one or more application programs 628, other program modules 630, and program data 632. Each of such operating system 626, one or more application programs 628, other program modules 630, and program data 632 (or some combination thereof) may implement all or part of the resident components that support the distributed file system.

A user can enter commands and information into computer 602 via input devices such as keyboard 634 and a pointing device 636 (e.g., a "mouse"). Other input devices 638 (not shown specifically) may include a microphone, joystick, game pad, satellite dish, serial port, scanner, and/or the like. These and other input devices are connected to processing unit 604 via input/output interfaces 640 that are coupled to system bus 608, but may be connected by other interface and bus structures, such as a parallel port, game port, or a universal serial bus (USB).

Monitor 642 or other type of display device can also be connected to the system bus 608 via an interface, such as video adapter 644. In addition to monitor 642, other output peripheral devices can include components such as speakers (not shown) and printer 646 which can be connected to computer 602 via I/O interfaces 640.

Computer 602 can operate in a networked environment using logical connections to one or more remote computers, such as remote computing device 648. By way of example, remote computing device 648 can be a PC, portable computer, a server, a router, a network computer, a peer device or other common network node, and the like. Remote computing device 648 is illustrated as a portable computer that can include many or all of the elements and features described herein relative to computer 602. Alternatively, computer 602 can operate in a non-networked environment as well.

Logical connections between computer 602 and remote computer 648 are depicted as a local area network (LAN) 650 and a general wide area network (WAN) 652. Such networking environments are commonplace in offices, enterprise-wide computer networks, intranets, and the Internet.

When implemented in a LAN networking environment, computer 602 is connected to local network 650 via network interface or adapter 654. When implemented in a WAN networking environment, computer 602 typically includes modem 656 or other means for establishing communications over wide network 652. Modem 656, which can be internal or external to computer 602, can be connected to system bus 608 via I/O interfaces 640 or other appropriate mechanisms. It is to be appreciated that the illustrated network connections are examples and that other means of establishing at least one communication link between computers 602 and 648 can be employed.

In a networked environment, such as that illustrated with computing environment 600, program modules depicted relative to computer 602, or portions thereof, may be stored in a remote memory storage device. By way of example, remote application programs 658 reside on a memory device of remote computer 648. For purposes of illustration, applications or programs and other executable program components such as the operating system are illustrated herein as discrete blocks, although it is recognized that such programs and components reside at various times in different storage components of computing device 602, and are executed by at least one data processor of the computer.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed:

1. A method for image data compression, comprising:
Approximating at least one non-power-of-2 element of a base matrix as a power-of-2 element such that all elements of a resultant matrix $T_2$ are power-of-2 elements, wherein the resultant matrix $T_2$ is:

$$T_2 = \begin{pmatrix} 1 & 1 & 1 & 1 & 1 & 1 & 1 & 1 \\ a & b & c & d & -d & -c & -b & -a \\ e & f & -f & -e & -e & -f & f & e \\ c & d & -a & -b & b & a & -d & -c \\ 1 & -1 & -1 & 1 & 1 & -1 & -1 & 1 \\ b & -a & -d & c & -c & d & a & -b \\ f & -e & e & -f & -f & e & -e & f \\ d & -c & b & -a & a & -b & c & -d \end{pmatrix}$$

wherein further, for floating point coefficients a, b, c, d, e, and f:

a≧b≧c≧d and e≧f, a=2, b=2, c=1, all d=½ or all d=¼, e=2 and f=1; and encoding video data using the resultant matrix $T_2$.

2. A method according to claim 1, wherein the base matrix is a DCT (discrete cosine transform) matrix.

3. A method according to claim 1, wherein the approximating includes manipulating an order of the one or more elements in a particular row of the base matrix.

4. A method according to claim 1, wherein the approximating includes manipulating the signs of the one or more elements in a particular row of the base matrix.

5. A method according to claim 1, wherein the approximating includes manipulating an order and the signs of the one or more elements in a particular row of the base matrix.

6. A method according to claim 1, wherein the approximating includes approximating floating point coefficients as power-of-2 coefficients to preserve a threshold relationship between the floating point coefficients.

7. A method according to claim 1, wherein the approximating includes approximating floating point coefficients as power-of-2 coefficients to preserve a relative ratio among the floating point coefficients.

8. A method according to claim 1, wherein the row vectors of the resultant matrix $T_2$ are orthogonal.

9. A method according to claim 1, wherein multiplication for non-integer d is implemented by a two-bit right shift.

10. An image data encoding apparatus, comprising:

a transformer to perform a 2-power transform on an incoming array of pixels, the transformer to perform the 2-power transform using a symmetrical matrix in which all elements are expressed as power-of-2 elements, wherein the resulting matrix $T_2$ is:

$$T_2 = \begin{pmatrix} 1 & 1 & 1 & 1 & 1 & 1 & 1 & 1 \\ a & b & c & d & -d & -c & -b & -a \\ e & f & -f & -e & -e & -f & f & e \\ c & d & -a & -b & b & a & -d & -c \\ 1 & -1 & -1 & 1 & 1 & -1 & -1 & 1 \\ b & -a & -d & c & -c & d & a & -b \\ f & -e & e & -f & -f & e & -e & f \\ d & -c & b & -a & a & -b & c & -d \end{pmatrix}$$

wherein further, for floating point coefficients a, b, c, d, e, and f:

a≧b≧c≧d and e≧f, a=2, b=2, c=1, all d=½ or all d=¼, e=2 and f=1;

a quantizer to quantize the transformer result; and an inverse transformer to perform an inverse 2-power transform on the quantizer result.

11. An apparatus according to claim 10, wherein an order of two or more elements in a particular row of the symmetrical matrix have been changed within the resulting matrix $T_2$.

12. An apparatus according to claim 10, wherein the signs of one or more elements in a particular row of the symmetrical matrix have been changed within the resulting matrix $T_2$.

13. An apparatus according to claim 10, wherein the symmetrical matrix is a DCT matrix template.

14. An apparatus according to claim 10, wherein the row vectors of the resulting matrix $T_2$ are orthogonal.

15. A computer-readable storage medium encoded with one or more computer-executable instructions, the one or more computer-executable instructions configured to cause one or more processors to:

create a matrix such that all elements in the matrix are expressed as power-of-2 coefficients, wherein the resultant matrix $T_2$ is:

$$T_2 = \begin{pmatrix} 1 & 1 & 1 & 1 & 1 & 1 & 1 & 1 \\ a & b & c & d & -d & -c & -b & -a \\ e & f & -f & -e & -e & -f & f & e \\ c & d & -a & -b & b & a & -d & -c \\ 1 & -1 & -1 & 1 & 1 & -1 & -1 & 1 \\ b & -a & -d & c & -c & d & a & -b \\ f & -e & e & -f & -f & e & -e & f \\ d & -c & b & -a & a & -b & c & -d \end{pmatrix}$$

wherein further the floating point coefficients are:

a=2, b=2, c=1, all d=½ or all d=¼, e=2 and f=1; and encode video data using the resultant matrix $T_2$.

16. A computer-readable storage medium according to claim 15, wherein to create the matrix is to change at least one of an order of one or more elements in a particular row of a template matrix.

17. A computer-readable storage medium according to claim 15, wherein to create the matrix is to change the sign of at least one element in a particular row of a template matrix.

18. A computer-readable storage medium according to claim 17, wherein the template matrix is a DCT matrix.

19. A computer-readable storage medium according to claim 16, wherein the template matrix is a DCT matrix.

20. A computer-readable storage medium according to claim 15, wherein the row vectors of the resultant matrix $T_2$ are orthogonal.

21. An image data encoding apparatus, comprising:

means for performing a 2-power transform on an incoming array of pixels, wherein all elements of the 2-power transform are equal to power-of-2 elements such that the resulting transform matrix $T_2$ is:

$$T_2 = \begin{pmatrix} 1 & 1 & 1 & 1 & 1 & 1 & 1 & 1 \\ a & b & c & d & -d & -c & -b & -a \\ e & f & -f & -e & -e & -f & f & e \\ c & d & -a & -b & b & a & -d & -c \\ 1 & -1 & -1 & 1 & 1 & -1 & -1 & 1 \\ b & -a & -d & c & -c & d & a & -b \\ f & -e & e & -f & -f & e & -e & f \\ d & -c & b & -a & a & -b & c & -d \end{pmatrix}$$

wherein further the floating point coefficients are:

a=2, b=2, c=1, all d=½ or all d=¼, e=2 and f=1;

means for quantizing the transformer result; and means for performing an inverse 2-power transform on the quantizer result.

* * * * *

UNITED STATES PATENT AND TRADEMARK OFFICE
CERTIFICATE OF CORRECTION

| | | |
|---|---|---|
| PATENT NO. | : 7,379,500 B2 | Page 1 of 1 |
| APPLICATION NO. | : 10/674932 | |
| DATED | : May 27, 2008 | |
| INVENTOR(S) | : Lu et al. | |

It is certified that error appears in the above-identified patent and that said Letters Patent is hereby corrected as shown below:

In column 3, line 24, after "the" insert -- ⊗ --.

In column 4, lines 53-54, delete "pair, 2-power" and insert -- pairs, for 2-power --, therefor.

In column 12, line 23, in Claim 15, delete "d=1/2or" and insert -- d=1/2 or --, therefor.

Signed and Sealed this
Third Day of May, 2011

David J. Kappos
*Director of the United States Patent and Trademark Office*